US006306026B1

(12) United States Patent
Post

(10) Patent No.: US 6,306,026 B1
(45) Date of Patent: Oct. 23, 2001

(54) APPARATUS AND METHOD FOR PARALLEL PROCESSING OF A PLURALITY OF CATTLE CARCASSES SUSPENDED FROM A CONVEYOR

(75) Inventor: Gerard Jan Post, Hengelo (NL)

(73) Assignee: Stork MPS B.V., Lichtenvoorde (NL)

( * ) Notice: Subject to any disclaimer, the term of this patent is extended or adjusted under 35 U.S.C. 154(b) by 0 days.

(21) Appl. No.: 09/591,873

(22) Filed: Jun. 12, 2000

(30) Foreign Application Priority Data

Jun. 11, 1999 (NL) .................................................... 1012307

(51) Int. Cl.⁷ ................................. A22B 5/00; A22B 5/18
(52) U.S. Cl. ............................................................. 452/106
(58) Field of Search .................................. 452/106, 117, 452/118, 63, 72, 96, 183, 177

(56) References Cited

U.S. PATENT DOCUMENTS

| | | | |
|---|---|---|---|
| 2,738,547 | * 3/1956 | Zebarth | 452/106 |
| 2,817,874 | * 12/1957 | Conaway | 452/106 |
| 3,711,897 | * 1/1973 | Viscolosi | 452/118 |
| 3,766,602 | * 10/1973 | Bottomley et al. | 452/106 |
| 3,806,988 | * 4/1974 | Harben, Jr. | 452/118 |
| 3,990,126 | 11/1976 | Ochylski . | |
| 4,090,275 | * 5/1978 | Jorgensen et al. | 452/106 |
| 4,146,945 | 4/1979 | Hotard . | |
| 4,876,767 | * 10/1989 | Harben, III et al. | 452/106 |
| 4,899,421 | * 2/1990 | Van Der Eerden | 452/106 |
| 5,346,427 | * 9/1994 | Clark | 452/117 |

FOREIGN PATENT DOCUMENTS

| | | | |
|---|---|---|---|
| 2593676 | * 8/1987 | (FR) | 452/106 |
| 2095973 | 10/1982 | (GB) . | |
| 9001591 | 7/1990 | (NL) . | |

OTHER PUBLICATIONS

Search Report in NL 1012307.
Stork brochure "F–line Automation in Pig Processing" (undated).

* cited by examiner

Primary Examiner—Willis Little
(74) Attorney, Agent, or Firm—Mitchell G. Stockwell; Kilpatrick Stockton LLP

(57) ABSTRACT

The invention disclosed in this document relates to an apparatus and method for parallel processing of a plurality of cattle carcasses suspended from a conveyor. At least two processing stations are provided that displace, or move, in a direction parallel to the conveyor. Each of the two stations performs generally the same processing operation on a carcass and each station has an individual coupling means for releasably engaging on the conveyor, wherein the processing stations are displaceable along a common guide. The processing stations are preferably connected flexibly to each other such that the interval between the processing stations in a position coupled to the conveyor is greater than in a position disconnected from the conveyor.

13 Claims, 1 Drawing Sheet

APPARATUS AND METHOD FOR PARALLEL PROCESSING OF A PLURALITY OF CATTLE CARCASSES SUSPENDED FROM A CONVEYOR

CROSS-REFERENCE TO RELATED APPLICATIONS

This application claims priority to Dutch application no. 1012307, filed Jun. 11, 1999, which application is hereby incorporated in its entirety by this reference.

TECHNICAL FIELD

The invention relates to an apparatus and a method for parallel processing of a plurality of cattle carcasses suspended from a conveyor. The apparatus comprises at least two similar processing stations that displace along a common guide. Coupling mechanisms between the stations, the guide and the carcasses function to vary the interval between the stations as the stations operate on the passing carcasses. Methods for moving the processing stations parallel to the conveyor and varying their separation are also disclosed.

BACKGROUND OF THE INVENTION

Large scale processing of cattle and other slaughtered animal carcasses generally takes place automatically. Carcasses are suspended from a conveyor by their hind legs and are transported for processing along a prescribed path. Adjacent the path are a number of processing stations that perform operations such as: opening the breast and abdomen, cleaving, vent-cutting, neck-cutting, leaf-fat stripping and evisceration. Because, among other reasons, not all operations take the same amount of time and in order to have the conveyor advance at a constant speed, the plant could decide to situate a plurality of similar processing stations parallel to the transporting direction of the conveyor.

In practice, the separation between carcasses suspended from a conveyor varies for a number of reasons. For instance, wear of the conveyor, varying intervals in the (partially manual) hooking of the carcasses to the conveyor, varying size of the carcass (for larger animals especially), etc. are some of the factors that change the spacing between carcasses. This makes impossible, or at least inefficient, the use of multiple parallel processing stations that displace in a fixed mutual orientation along a guide.

Notwithstanding such problems, a British patent application, GB 2 095 973, describes a device for processing poultry provided with a guide running parallel to a conveyor and along which at least one tool displaces synchronously with the poultry carcasses in an active position. The tool can be moved back to a starting position. A device is also described with a plurality of tools displaceable along the guide, where the tools are assembled on a common carriage.

A Netherlands publication, NL 9 001 591, describes apparatus for exerting a tensile force on the halves of a slaughtered animal in order to improve the meat quality. The stretching apparatus travels along a track in the transport direction of a slaughterhouse line. But there is no reference to a parallel arrangement of multiple such stretching apparatuses.

Several U.S. patents reveal similar systems. For instance, U.S. Pat. No. 4,146,945 describes a device for cleaving carcasses. A cleaving saw moves along a frame to process the carcass during transport. While a number of saws may operate in parallel, plant workers cannot adjust the interval between the saws. Similarly, U.S. Pat. No. 3,990,126 describes a device for removing pig's heads. Hooks separated by a fixed, common distance line up to the carcasses and move more or less parallel to the direction of movement of the carcasses. A hook snags the pig's head, after which the pig conveyor moves away from the hook, causing the head to separate.

Collectively, none of the above approaches provide for parallel, but flexible, processing of the carcasses. In other words, in order to make most efficient use of plant processing space, it would be desirable to provide mechanisms and methods for parallel processing where the processors at least somewhat independently move relative to one another as they also move alongside the carcass conveyor.

SUMMARY OF THE INVENTION

This invention aims to provide an apparatus and method for parallel processing of a plurality of cattle carcasses suspended from a slaughter line by which a plurality of carcasses separated by varying distances can be processed simultaneously and in parallel in an efficient and effective manner.

The invention provides for this purpose an apparatus having processing stations located alongside a carcass conveyor. Each station may be outfitted with means for realizably coupling the processing stations to the conveyor so that the interval between the processing stations in a position coupled to the conveyor is variable relative to the interval in a position disconnected from the conveyor. The variability in interval allows the same operation on a plurality of carcasses to be performed in parallel and accurately by multiple independent processing stations. This invention achieves increased accuracy because it individually positions the processing stations relative to the carcasses. Despite varying intervals between the carcasses, the processing stations can each be placed in the desired orientation in relation to an associated carcass; the intervals between the processing stations are correlated to the intervals between the carcasses being presented for processing. This invention thus makes it possible, even efficient, to process cattle or other large animal carcasses suspended from a conveyor by means of a number of processing stations placed in parallel and co-displaced with the conveyor. Such results could not before have been achieved in view of the varying intervals between suspended carcasses.

In a preferred embodiment the processing stations displace along a guide. The guide can be common to both processing stations or separate. The processing stations may move along the guide(s), to at least a limited extent, independently of one another. The processing stations preferably couple to one another with mutually variable spacing. The mechanism for displacing the processing stations parallel to the conveyor can be formed by coupling means for releasably coupling the conveyor and the processing stations.

In another embodiment, the processing stations also may connect flexibly or retractibly to each other. The advantage of the flexible coupling of the processing stations is that the processing stations can be returned to a starting position —e.g., in a direction opposite to the transporting direction of the conveyor. This displacement can take place with a single drive, wherein, for instance, the foremost processing station pushes back the subsequent station(s) or the rearmost processing station pulls back the preceding station(s).

Configuring multiple processing stations to displace independently of each other allows for optimal positioning relative to successive carcasses on the conveyor—irrespective of the intervals between the carcasses. The coupling with mutually variable intervals enables the processing stations to engage at the precise position where the carcasses are located. In another configuration, the coupling may allow the processing stations to be displaced simultaneously with the conveyor by means of the same drive used to drive the conveyor. The processing stations may engage on a chain of the conveyor, the drive of the conveyor, the shackle connecting conveyor to carcass, the carcass itself or any other structure sufficiently strong to allow the coupling mechanism to displace the processing station with its respective carcass.

Using the individual coupling means the processing stations can be attached to the conveyor at the position where the carcasses for processing are located. After effecting a coupling between a processing station and e.g., the conveyor the processing station is carried along with the conveyor and the processing of the carcass can take place. In practice the engagement can advantageously take place on the carrier or spreader of a carcass.

In a preferred embodiment the processing stations may connect by means of a resilient coupling, such as via air cylinders, mechanical springs, pneumatic cylinders, hydraulic cylinders or the like, so that the processing stations are biased toward one another. The processing stations can be connected one to another in a strand of stations and/or a first and a last processing station of a series of mutually connected processing stations can be connected. By biasing the processing stations toward one another, after disconnection the processing stations automatically will move toward a starting position in which, preferably, the intervals among processing stations are less in their starting position than intervals during their operation on their respective carcasses.

A variety of mechanical devices may be used temporarily to couple the processing stations to the conveyor. In general, a particular coupling mechanism for coupling a processing station with a conveyor, carcass, carrier, spreader or part thereof, should have the ability to couple the processing station so that its respective position with the conveyor is maintained during processing operations. The individual coupling means can thus ensure that a processing station takes up a more or less fixed position relative to a carcass for processing.

A drive may provide for the return movement of the processing stations in the direction opposed to the direction of movement of the conveyor after the processing is complete. The disconnected processing stations can be carried simultaneously to a starting position with a single drive, wherein it is desirable that control means be provided for controlling the displacements of the processing stations.

BRIEF DESCRIPTION OF THE DRAWINGS

The present invention will be further elucidated with reference to the illustrative, non-limiting embodiments shown in the following figures.

DETAILED DESCRIPTION

Figure 1:
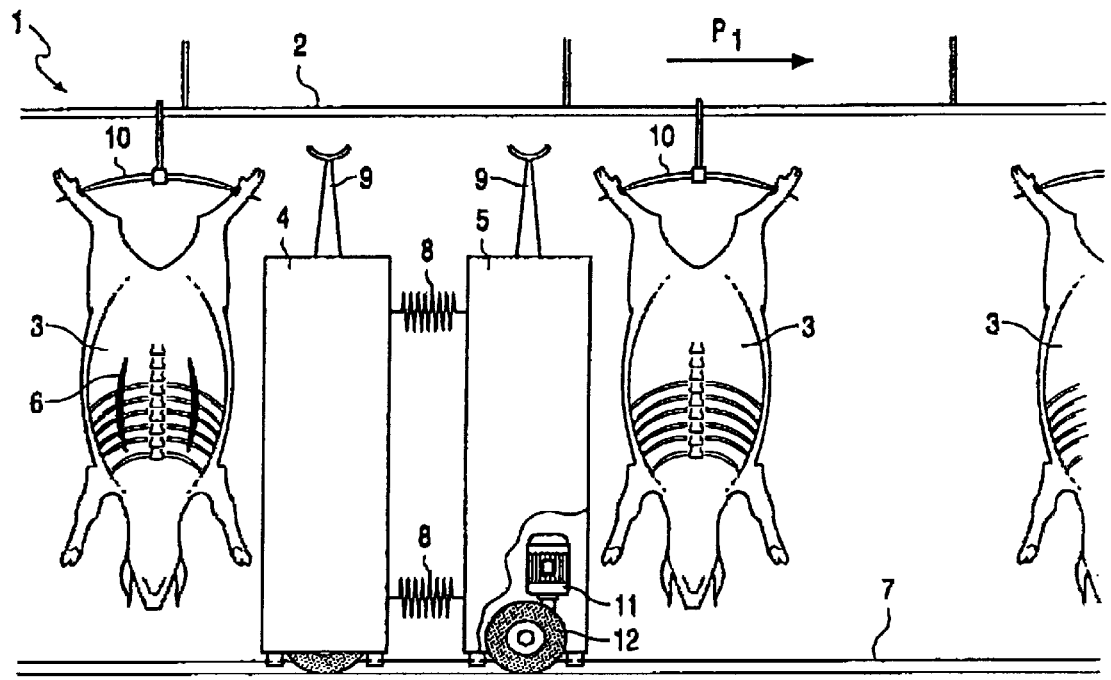
FIG. 1 shows a side view of an apparatus according to the invention in which the processing stations are in a non-active starting position.

FIG. 1 shows an apparatus 1 for parallel processing of cattle carcasses 3 suspended from a conveyor 2. Carcasses 3 are moved along conveyor 2 in a transporting direction P1.

Arranged to the side of conveyor 2 are two processing stations 4, 5 which are only shown schematically in this figure. Processing stations 4, 5 can for instance be adapted to remove leaf fat 6 from carcasses 3. As noted above, processing stations can perform a variety of processing operations on the carcasses, including: opening the breast and abdomen, cleaving, vent-cutting, neck-cutting, leaf-fat stripping and evisceration. Skilled persons will recognize that the type of processing performed by the station is not important to this invention and may be greatly varied.

Processing stations 4, 5 move parallel to conveyor 2 along a guide 7, shown in the figures as a guide common to both stations 4, 5, although individual station guides may be used. In practice the guide 7 usually consists of a guide track that runs above the ground and on which processing stations 4, 5 are suspension mounted. Other guides can be used, including: a track formed in the surface of the floor for keeping the wheels of the stations aligned during movement alongside the conveyor; a track designed to constrain the sides or top of the processing apparatus to guide it along the desired path; an electronic guide consisting of sensors and processors by which the stations are maintained in a desired path, or other guide mechanisms skilled persons will recognize for guiding the stations alongside the conveyors.

FIG. 1 shows the stations 4, 5 in a starting position. In the embodiment shown, two draw springs 8 flexibly and retractibly connect the processing stations 4, 5 to each other. In the starting position shown in FIG. 1, the processing stations 4, 5 are pulled together by the draw springs 8 such that the intervals between stations 4, 5 are smaller than or equal to the intervals between successive carcasses 3. Skilled persons will recognize that a single or more than two draw spring(s) 8 may be used to couple the stations 4,5 depending, e.g., on the stations' mass, the conveyors' speed and various other factors. Also, other mechanical structures can implement the station 4,5, coupling. Hydraulic or pneumatic lines, controlled brakes on the stations' 4, 5 wheels, or even hinged arms could be used retratibly to couple the stations 4,5. These, and other equivalent, mechanisms can be used to couple the stations so that only one station moves relative to the other(s) or so that each station is connected with mutually variable spacing.

Processing stations 4, 5 are also provided with individual coupling means 9 by which the stations engage the suspension hooks or spreaders 10 on which the carcasses 3 hang. The releasable coupler 9 shown in the Figures is depicted as a hook that clasps to a portion of the shackle by which the carcass is attached to the conveyor. The hook can be mounted on the stations 4,5 to pivot or move forward so as to engage the spreader 10. Of course, as noted above, the hook can attach to other portions of the conveyor, shackle, spreader bar or carcass itself. Skilled persons will recognize that a variety of other, equivalent structures exist for coupling the processing stations to the carcasses. By way of example, the following mechanisms could be used:

A clamp can be attached to each processing station to grip the shackle, spreader 10 or even the carcass 3.

An interlocking coupler could be used whereby a first part of the coupling is located on the processing station and a second part is on the shackle or spreader. As the carcasses move by, the first and second parts releasably mate together.

A sharp hook could be attached to the processing station and be used to hook into the meat of the carcass.

The intention is to provide a mechanism for allowing the conveyor (or part carried thereby) to impart its movement to the processing station via the coupling mechanism (or vice versa), so skilled persons will recognize that a variety of equivalent structures are available to achieve this objective.

One of the processing stations 5 is shown partly cut-away and shows a drive 11 for a wheel 12 by which processing stations 4, 5 can be returned to the shown position after being displaced in transporting direction P1. Although both stations may be provided independent drives, it may be advantageous to use only a single drive 11 and wheel 12 for processing station 5 by which the other processing station 4 may be carried along the return path because the drive force is transmitted at least partly through the coupling (e.g., draw springs 8) between stations 4, 5. Skilled persons will recognize that there are structural advantages when the last processing station 4 placed along conveyor 2 is provided with drive 11 and wheel 12 because of the simplicity which results from using this processing station 4 as reference point.

Figure 2:
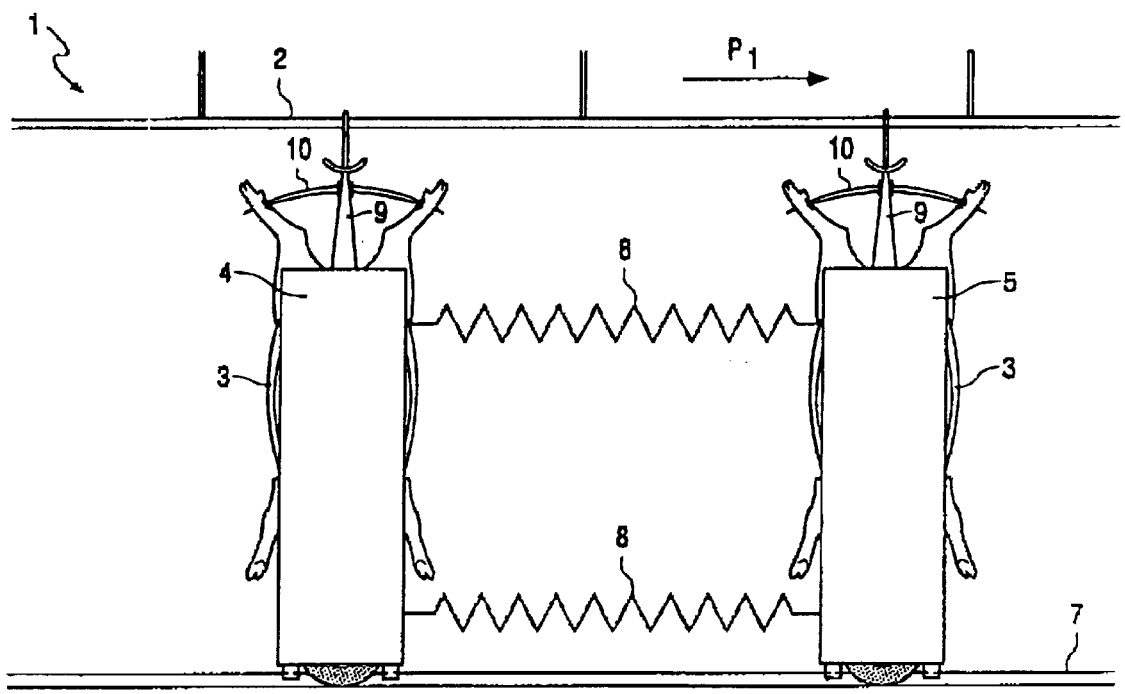
FIG. 2 is a side view of the apparatus shown in FIG. 1 in a situation in which both processing stations are in operation.

FIG. 2 shows apparatus 1 in an active position in which processing stations 4, 5 engage using coupler 9 on respective successive spreaders 10 on which carcasses 3 are hanging. Processing stations 4, 5 are carried along in transporting direction P1 via momentum transferred from spreaders 10 through the coupler such that the desired processing can be performed on the carcass. The length of guide 7 is fixed based on to the speed of the conveyor and the necessary time period needed to complete the particular processing operation on the carcass. Clearly visible in FIG. 2 is that when draw springs 8 extend, the interval between stations 4, 5 is considerably larger than the interval between those stations 4, 5 when they are in the starting situation shown in FIG. 1.

After the operations are completed, stations 4, 5 are disconnected from spreader 10 and returned to the starting position by means of drive 11 and wheel 12, not shown in this figure. Apparatus 1 is relatively simple to control by means of a control unit not shown in this figure.

Although the invention is elucidated with reference to only a single, preferred embodiment, it will be apparent to all that the invention is in no way limited to the described and shown embodiment. On the contrary, many more variations are possible for a skilled person within the scope of the invention.

What is claimed is:

1. Apparatus for parallel processing of a plurality of cattle or other large animal carcasses suspended from a conveyor, the apparatus comprising:
   (a) at least two processing stations, each of which (i) performs substantially the same processing operation and (ii) is adapted to couple to the conveyor,
   (b) at least one guide by which the processing stations may be displaced generally parallel to the conveyor,
   (c) at least one means for coupling the processing stations so that the interval between the processing stations when the processing stations are coupled to the conveyor varies from the interval between the processing stations when the processing stations are not coupled to the conveyor.

2. Apparatus as claimed in claim 1, wherein the processing stations are displaceable along the guide generally independently of each other.

3. Apparatus as claimed in claim 1, wherein the processing stations are connected with mutually variable spacing.

4. Apparatus as claimed in claim 1 further comprising means for releasably coupling at least one of the at least two processing stations to the conveyor.

5. Apparatus as claimed in claim 3, wherein the processing stations are connectedly flexibly to each other.

6. Apparatus as claimed in claim 4, wherein the coupling means is selected from the group consisting of a spring, multiple springs, a pneumatic cylinder, and a hydraulic cylinder, such that the coupling means biases the processing stations toward each other.

7. Apparatus as claimed in claim 1, further comprising an interconnected first and a last processing station of a series of mutually connected processing stations.

8. Apparatus as claimed in claim 1 further comprising a drive for moving the processing stations in at least the direction opposed to the direction of movement of the conveyor.

9. A method for processing slaughtered animal carcasses carried on a conveyor where the intervals between the carcasses may vary, the method comprising:
   (a) coupling at least two processing stations to one another in a manner that allows the interval between the processing stations to vary;
   (b) releasably attaching the at least two processing stations to the conveyor so that each of the processing stations aligns and moves with a carcass to be processed; and
   (c) performing processing operations on the carcasses at each of the processing stations, whereby during the processing operations a first interval between the processing stations varies from an original interval existing between the processing stations when they are not coupled to the conveyor.

10. A method according to claim 9 in which the first interval is greater than the second interval.

11. A method according to claim 10 further comprising the step of guiding the at least two processing stations along a selected path to facilitate processing operations.

12. A method according to claim 11 in which each of the processing stations independently releasably couples to the conveyor.

13. A method according to claim 9 in which the attaching step includes the step of forming between the conveyor and at least one of the at least two processing stations a generally rigid construction such that when coupled the processing station is substantially unvaryingly positioned in relation to the conveyor.

* * * * *